United States Patent [19]

Riser et al.

[11] Patent Number: 5,790,723

[45] Date of Patent: *Aug. 4, 1998

[54] MULTIPORT ILLUMINATOR OPTIC DESIGN FOR MACRO-FIBERS

[75] Inventors: Andrew P. Riser, Capistrano Beach; John F. Forkner, Laguna Beach, both of Calif.

[73] Assignee: Remote Source Lighting International, San Juan Capistrano, Calif.

[*] Notice: The term of this patent shall not extend beyond the expiration date of Pat. No. 5,706,376.

[21] Appl. No.: 645,324

[22] Filed: May 13, 1996

Related U.S. Application Data

[63] Continuation-in-part of Ser. No. 374,163, Jan. 17, 1995, Pat. No. 5,559,911, and a continuation-in-part of Ser. No. 459,613, Jun. 2, 1995, Pat. No. 5,706,376, and a continuation-in-part of Ser. No. 599,970, Feb. 14, 1996.

[51] Int. Cl.$^6$ ................................................ G02B 6/26
[52] U.S. Cl. ........................... 385/31; 385/33; 385/34; 385/47; 385/901; 362/32
[58] Field of Search ............................ 385/31, 33, 34, 385/47, 92, 93, 901; 362/32

[56] References Cited

U.S. PATENT DOCUMENTS

| | | | |
|---|---|---|---|
| 4,050,784 | 9/1977 | Kobayashi | 385/34 X |
| 4,389,698 | 6/1983 | Cibie | 362/32 |
| 4,811,171 | 3/1989 | Viola | 362/32 |
| 4,811,172 | 3/1989 | Davenport et al. | 362/61 |
| 4,816,975 | 3/1989 | Bahnemann et al. | 362/308 |
| 4,851,969 | 7/1989 | Davenport et al. | 362/61 X |
| 4,868,718 | 9/1989 | Davenport et al. | 362/32 |
| 4,912,605 | 3/1990 | Whitehead | 362/32 |
| 4,949,227 | 8/1990 | Finch et al. | 362/61 |
| 4,958,263 | 9/1990 | Davenport et al. | 362/32 |
| 4,961,622 | 10/1990 | Gorman et al. | 385/33 X |
| 5,222,793 | 6/1993 | Davenport et al. | 385/32 |
| 5,259,056 | 11/1993 | Davenport et al. | 385/115 |
| 5,367,590 | 11/1994 | Davenport et al. | 385/901 X |
| 5,396,571 | 3/1995 | Saadatmanesh et al. | 385/33 |
| 5,559,911 | 9/1996 | Forkener et al. | 385/33 |

FOREIGN PATENT DOCUMENTS

| | | | |
|---|---|---|---|
| 2651283 | 5/1978 | Germany | 362/32 X |
| 2098311 | 11/1982 | United Kingdom | 385/901 X |

*Primary Examiner*—Phan T.H. Palmer
*Attorney, Agent, or Firm*—Donald E. Stout; Kenton R. Mullins

[57] ABSTRACT

The inventive system, which is used in transmitting illumination from a central source to a variety of remote locations, efficiently couples the light originating from an arc lamp, or similar source, into a multiplicity of flexible macroscopic fibers. The combination of the several elements of the inventive system results in a very efficient transfer of the energy of the light source to the fibers. Light from the arc lamp is fed into a circular light pipe, and then directly into a multi-sectored lens, without any requirement of a collimated lens. The multi-sectored lens then focusses the light into the multiplicity of flexible macroscopic fibers.

20 Claims, 4 Drawing Sheets

MULTIPORT ILLUMINATOR OPTIC DESIGN FOR MACRO-FIBERS

This application is a continuation-in-part of U.S. application Ser. No. 08/374,163 filed on Jan. 17, 1995 and entitled OPTICAL FIBER COUPLER USING SEGMENTED LENSES, which issued into U.S. Pat. No. 5,559,911 on Sep. 24, 1996; U.S. application Ser. No. 08/459,613 filed on Jun. 2, 1995 now U.S. Pat. No. 5,706,376 and entitled MULTIPORT ILLUMINATOR FOR MACRO-FIBERS; and co-pending U.S. application Ser. No. 08/599,970 filed on Feb. 14, 1996 and entitled OPTICAL COUPLER, all three of which are commonly assigned and the contents of which are expressly incorporated herein by reference. This application is related to co-pending U.S. application Ser. No. 08/645,325, filed on May 13, 1996 and entitled MULTIPORT application Ser. No. 08/645,326, filed on May 13, 1996 and entitled REFLECTOR FOR ILLUMINATION SYSTEM now U.S. Pat No. 5,661,828; and U.S. application Ser. No. 08/645,327, filed on May 13, 1996 and entitled REFLECTOR AND ILLUMINATION SYSTEM now U.S. Pat. No. 5,682,448, all three of which are commonly assigned and the contents of which are expressly incorporated herein by reference.

BACKGROUND OF THE INVENTION

Large diameter fiber optics, often referred to as "flexible light pipes", are well known in the art, and typically comprise a single, solid core fiber which is surrounded by a cladding layer and a sheath or shielding layer. The core is the portion of a light pipe which transmits light, and typically has a diameter of about 2 to 12 mm. It is formed of a very soft, semi-liquid plastic material, such as OPTIFLEX®, which is manufactured by Rohm & Haas Corporation, of Philadelphia, Pa. The cladding layer typically comprises polytetrafluoroethylene (PTFE or TEFLON®), or the like, while the outer sheath is fabricated of a material such as polyvinylchloride (PVC). Unlike small diameter optical fibers, which are typically used to transmit information in relatively complex control systems, these large diameter "light pipes" are typically employed in a variety of illumination systems where direct lighting is difficult to maintain, dangerous, or subject to vandalism. Examples include architectural lighting, display cases, pools and spas (to eliminate electrical connections near water), hazardous material zones (to eliminate the need for sealed lighting), or jail cells. They are particularly advantageous in that only a single centralized illumination system must be maintained, rather than a plurality of individual lights.

There are problems, however, in implementing state of the art light pipe illumination systems because of the difficulty of illuminating a plurality of light pipes from a single illumination source, as is discussed in related application Ser. No. 08/374,163 now U.S. Pat. No. 5,559,911. In order to maximize efficiency, the optical fibers must be bundled as closely as possible, to ensure the maximum ratio of core area (the part of each light pipe which actually transmits light) to total area. However, bundling the large diameter light pipes together in order to illuminate them from the single illumination source is difficult to do efficiently. Each of the individual light pipes are round and thus have a great deal of space between them due to the cladding and shielding layers. To obtain maximum efficiency, it is desirable to illuminate only the core of each of the bundled optical fibers, but this is impossible using state of the art bundling techniques. Necessarily, if the light from the source of illumination is spread across the array of optical fibers, it will illuminate not only the cores of the optical fibers, but also the cladding layers and shielding layers. Furthermore, the voids between the optical fibers, which are inevitable because of the fibers' round dimensions, also are impacted by the light from the illumination source. All of the light falling upon any element other than the cores is wasted, and becomes an efficiency loss, since it will not be transmitted by the fibers. Additionally, packing the fibers so closely together creates problems such as mechanical difficulties in configuring and accommodating the illumination system and difficulties encountered in attempting to replace one of the individual bundled fibers. This design also typically results in color variation between fibers unless techniques are specifically employed to prevent this problem.

One prior art solution to this problem has been to eliminate the sheathing and cladding layers about each optical fiber, in order to reduce the area across the bundled array of fibers which does not transmit light. However, there is still a packing factor problem because the optical fibers are round, and there are other physical disadvantages in eliminating those layers. Thus, this solution is unsatisfactory for most applications.

Another problem associated with prior art designs is the large number of optical components associated with these designs. Reducing the number of parts of any optical design would appear to be advantageous to any system.

SUMMARY OF THE INVENTION

This invention efficiently couples the light originating from an arc lamp, or similar source, into a multiplicity of flexible macroscopic fibers. Such a system is to be used in transmitting illumination from a central source to a variety of remote locations. The combination of the several elements of the inventive system results in a very efficient transfer of the energy of the light source to the fibers. Light from the arc lamp is fed into a circular light pipe, and then directly into a multi-sectored lens, without any requirement of a collimating lens. The multi-sector lens then focuses the light into the multiplicity of flexible macroscopic fibers.

The present invention, together with additional features and advantages thereof, may best be understood by reference to the following description taken in connection with the accompanying illustrative drawings.

DETAILED DESCRIPTION OF THE PREFERRED EMBODIMENT

Figure 1:
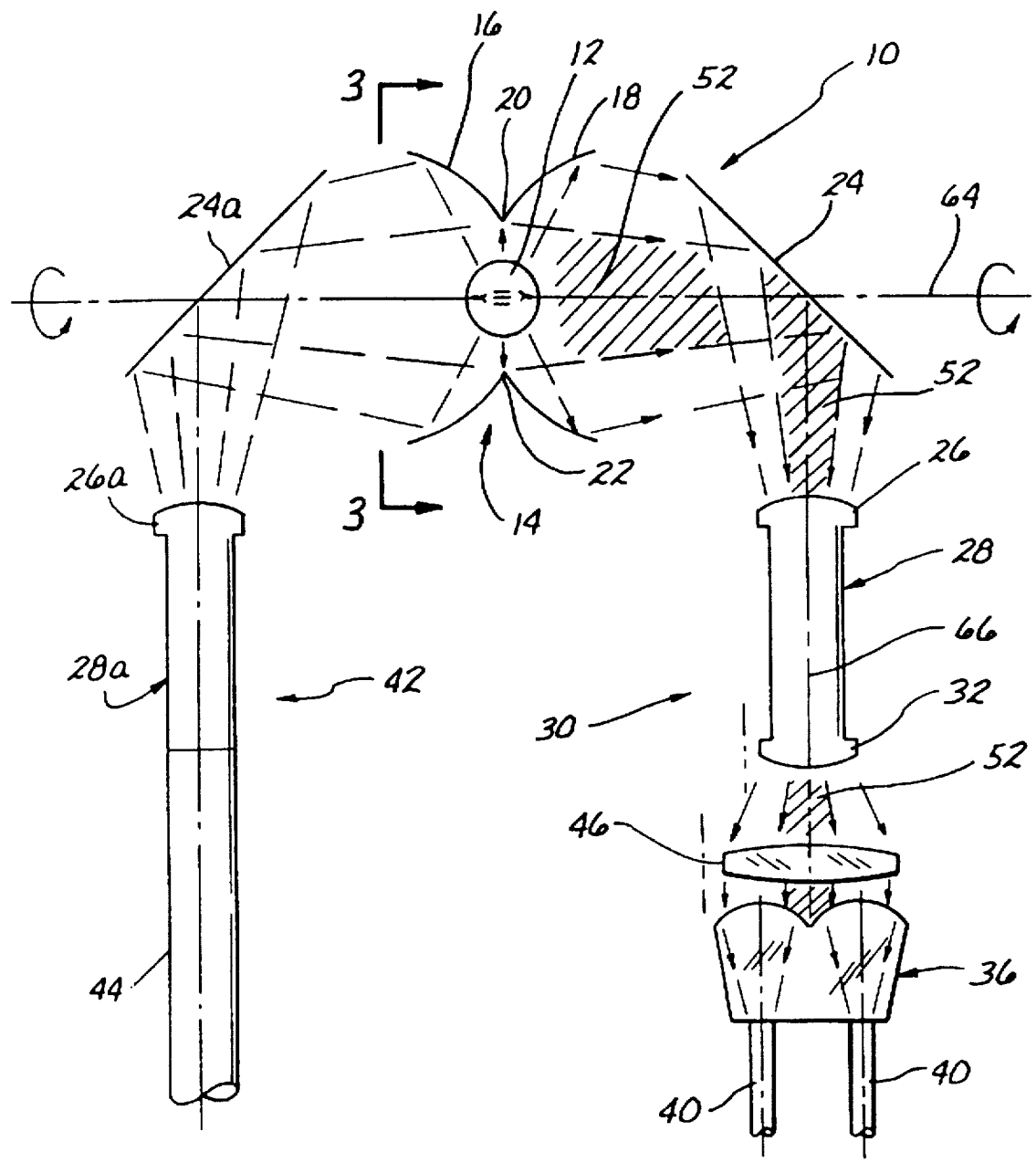
FIG. 1 is a schematic top view of a preferred embodiment of the inventive optical system.

Referring now more particularly to the drawings, an optical system 10 is illustrated which includes a compact light source 12, which may comprise an arc lamp or similar source. The light source 12 is placed at the focus of a dual curved reflector 14, which comprises two reflector portions 16 and 18 which are disposed in a back-to-back fashion. In each reflector portion 16, 18, the center or vertex region of the reflector has been removed, as illustrated, and the two reflector portions are joined at intersection points 20 and 22.

Light emitted from the light source 12, which is preferably a 500 watt source, is reflected by the dual reflector 14, as illustrated by the lines of incidence shown in FIG. 1, in two opposing directions, and is then directed through an angle of approximately 90 degrees (or any other desired angle) by each of two flat reflectors or fold mirrors 24 and 24a, respectively. Then, each focussed beam of light impinges on a lens end of a circular light pipe 28, 28a. Each of the two circular light pipes 28, 28a is comprised of a transparent material, such as glass or clear plastic, and is adapted to integrate the light beam by means of multiple reflections within the light pipe.

Figure 1A:
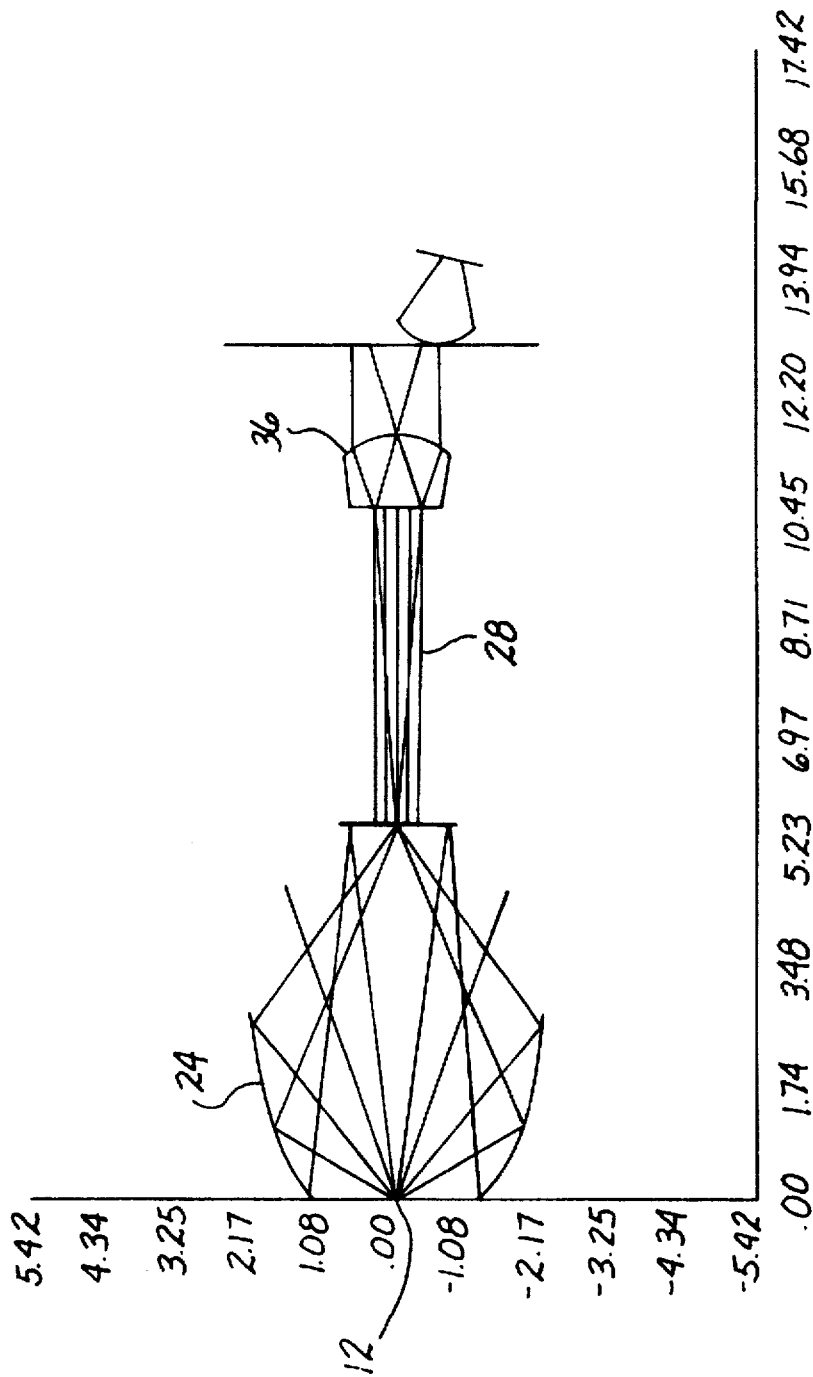
FIG. 1a is a side view of the optical system of FIG. 1, as expressed using optical analysis simulation.
Figure 4:
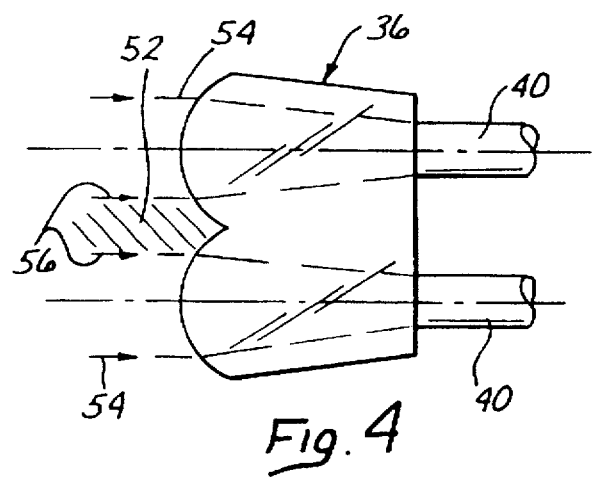
FIG. 4 is a schematic side view illustrating the multi-sector lens which forms a part of the optical system shown in FIG. 1.
Figure 5:
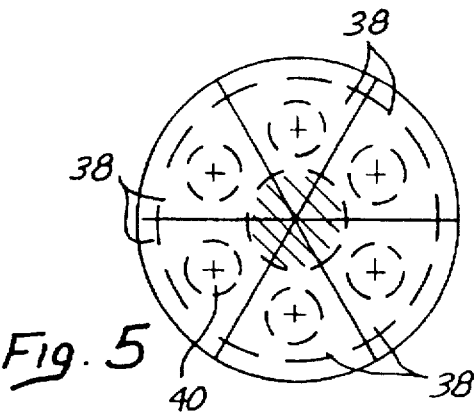
FIG. 5 is an end view of the multi-sector lens shown in FIG. 4.

On the right side of the system, or right channel 30, as illustrated, the light beam emerges from the light pipe 28 at an exit lens face 32. The diverging beam from the light pipe 28 is then split into a number of separate focussed beams by means of a multi-sectored lens 36 (FIGS. 1, 4 and 5). Each of the lens sectors 38 (FIG. 5) focusses onto the core of a corresponding output fiber 40. In a conventional optical design, a collimating lens would likely be required between the circular light pipe 28 and the multi-sectored lens 36. The multi-sectored lens 36 of the present invention, however, is modified over conventional lenses to obviate any need for a collimating lens. For example, the multi-sectored lens 36 is larger than would be required with a conventional collimating lens between the multi-sectored lens 36 and the circular light pipe 28. The special multi-sectored lens 36 of the present invention has been configured using analysis tools. FIG. 1a illustrates a simulated side view of the optical system shown in FIG. 1, using optical light path simulation.

The optical system for the left beam focussed by the dual reflector 14 through the left channel 42 can be essentially the same as that described with respect to the right channel 30, or some different features may be incorporated into the left channel. For example, the right channel 30 might have a sector lens accommodating ten output fibers while the left channel might only couple to a single large fiber or multi-fiber bundle 44.

Another useful feature of the invention, as illustrated in FIG. 1, is to incorporate a rotating color wheel 46 at the exit of the light pipe 28 or, alternatively, in front of the sector lens 36. Both locations are shown in the figure, though typically only one or the other of the color wheels 46 would actually be employed at one time. With the color wheel 46 at the light pipe exit, the color of the light to all of the fibers is the same and changes simultaneously as the wheel rotates. With the wheel near the entrance to the sector lens, the colors to each fiber are different and can change at different rates depending on the pattern of the wheel. These various color controls are useful in pool lighting, signs and other applications.

Figure 2:
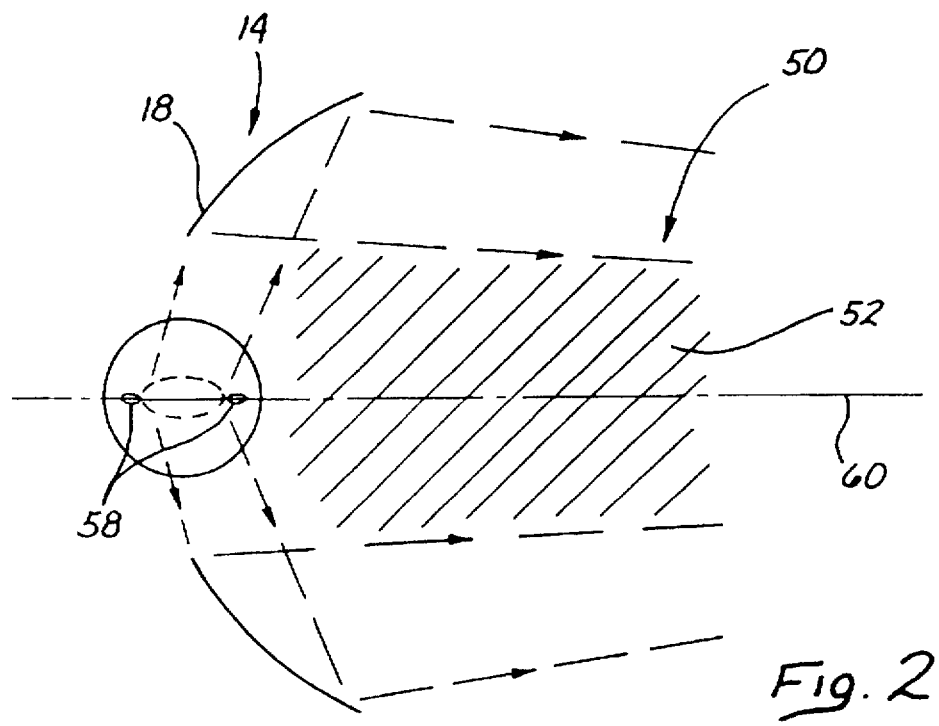
FIG. 2 is an enlarged schematic view of the lamp and right portion of the dual reflector illustrated in FIG. 1.
Figure 3:
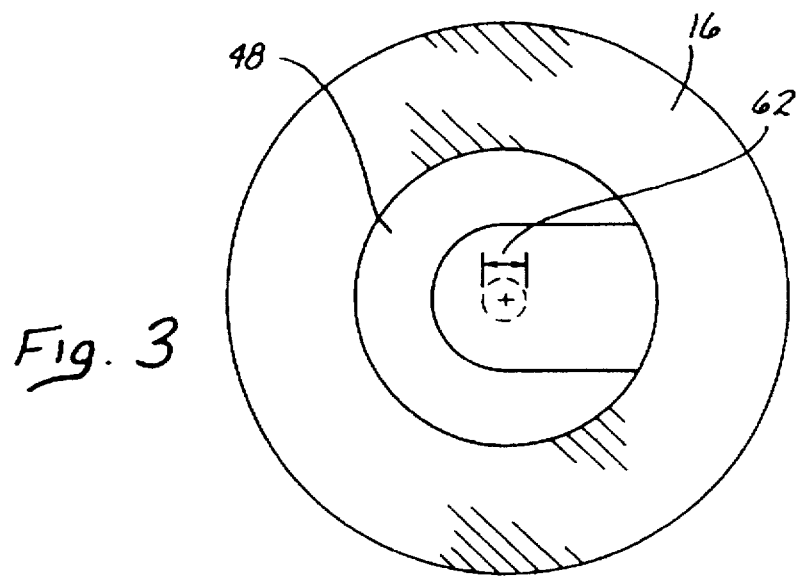
FIG. 3 is an end view of the dual reflector, taken along lines 3—3 in FIG. 1.

The high efficiency of this illumination system derives from the special design of a number of its elements working singly and in combination. The lamp 12 is preferably selected to have small arc dimensions so that it will couple into fibers of relatively small diameter (preferably 3 mm to 10 mm). The reflector 14 consists of two axially symmetrical curved halves or portions 16 and 18, with the lamp centered at their matching plane. This arrangement makes use of the very efficient collection properties of the low magnification section of the ellipsoidal (or near ellipsoidal) reflector shape. The large hole 48 in the center of each reflector half (FIG. 3) results in a focussed light beam with a ring-shaped cross section. The light entering the hole in the reflector is not lost but passes into the opposite reflector half and is focussed into the second focussed beam. This reflector arrangement efficiently generates a ring cross-section beam which is very useful in reducing the radial aperture required of each of the sector lenses 38. FIG. 2 shows a section through the right portion 18 of the dual reflector 14 indicating how the ring-shaped beam 50 is generated. The ring-shaped beam 50, wherein the darkened center portion 52 is represented by cross-hatching, is preserved through the light pipe 28. As shown best in FIG. 4, the ring-shaped beam impinges on the sector lens as well, and it can be seen that the outer boundary 54 of the beam 50 and the inner boundary 56 thereof, define the lens aperture in the radial direction. The ring beam thus very usefully limits the required lens aperture and permits lenses of relatively short focal length to be used. This ability to use short focal length lenses permits much more efficient coupling into small diameter fibers, thus unexpectedly increasing the efficiency of the system.

Another important feature of the invention is the orientation of the arc lamp 12. As illustrated particularly in FIG. 2, the lamp is shown at the focal point of the dual reflector 14. The long dimension of the arc discharge of the lamp 12, as defined by the position of the electrodes 58, is oriented so as to be substantially parallel and coincident with the reflector symmetry axis 60. The efficiency of transmission of the optical system is greatly influenced by the arc orientation with respect to the reflector because of the high length to diameter ratio (typically about 5x) of the arc. By aligning the lamp as described, the small dimension 62 of the arc (FIG. 3) becomes the controlling parameter in defining the minimum permissible output fiber diameter for efficient coupling. Small output fiber diameter is usually desired in most applications. Designing for minimum output fiber diameter permits larger fibers to also be coupled efficiently. In the presently preferred embodiment, the output fiber core diameter is nominally one half inch. This large diameter is required because the high output power of the light source may burn smaller fibers. Additionally, the sector lens of the present invention, which obviates any need for a collimating lens, has an aspheric shape that can be specified using standard optical equations.

Although six equal lens sectors 38 are illustrated in FIG. 5, the sector lens 36 can have as few as two and up to about twelve sectors. Also, the sectors need not be equal in area, since in some applications it may be desirable to deliver different amounts of light to different locations. The sector lens as a means of splitting the incident beam has a major advantage over currently used bundled fibers in that the sector lens array separates the fibers from each other (FIGS. 4 and 5), thereby permitting easy installation and removal of individual fibers.

The fold reflector 24, 24a may serve a multiple function of folding mirror and heat rejecting mirror. As a folding mirror, it also provides the ability of rotating the entire output optical system around a mechanical axis 64, as best shown in FIG. 1. This feature is very useful in allowing great flexibility in positioning the direction in which the fibers emerge from the unit. Independent rotation of the fold mirrors 24, 24a on either side of the lamp gives additional flexibility of output fiber location.

As described above, the circular light pipe 28 (as well as light pipe 28a) is used to integrate the angular distribution of the light around the pipe axis 66. This is advantageous since it allows the light output of each fiber to be identical (which is usually desired), because the angular light distribution from the lamp is not generally uniform. Additionally, the metal-halide type of arc lamp which is preferably used typically has some color differences in the angular distribution which also need to be integrated out in order to avoid undesirable color differences in output between fibers. Field lenses 26 and 32 (FIG. 1) are preferably employed on the light pipe ends to constrain the light inside the pipe so that it is totally reflected internally. Mechanically, the field lens portion 32 of the light pipe is larger in diameter than the pipe section itself in order to provide a loss-free means of mounting the light pipe. Anything touching the light pipe surface will bleed off some of the internally reflected light unless the pipe is clad, which is a disadvantageous approach since it reduces its numerical aperture and increases its cost.

The individual lens sectors 38 comprise a relay lens system that roughly images the output end of the light pipe onto the fiber port. The lens sectors may have aspheric shapes to reduce aberrations and improve efficiency, and are preferably given a thickness such that the output beam is focussed on the flat rear surface of the lens sector. This allows the soft core of the usual type of fiber to "wet" the lens surface, thereby reducing reflection losses at this interface.

Figure 8:
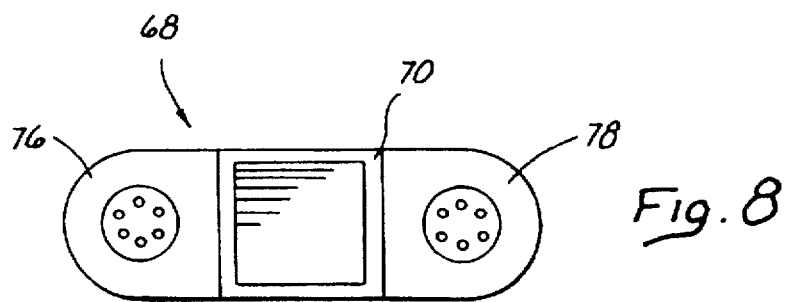
FIG. 8 is a schematic front view of the unit illustrated in FIGS. 6 and 7.
Figure 6:
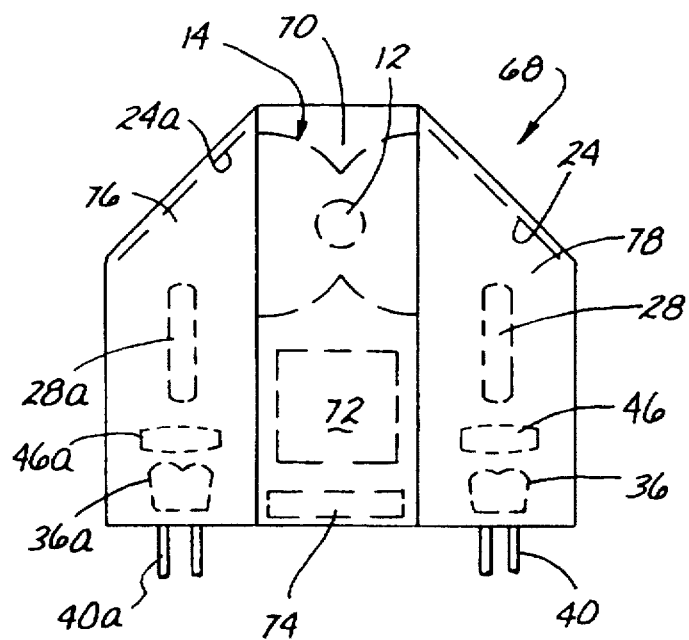
FIG. 6 is a schematic top view of an inventive fiber illumination unit, illustrating a housing containing the system elements shown in FIG. 1.
Figure 7:
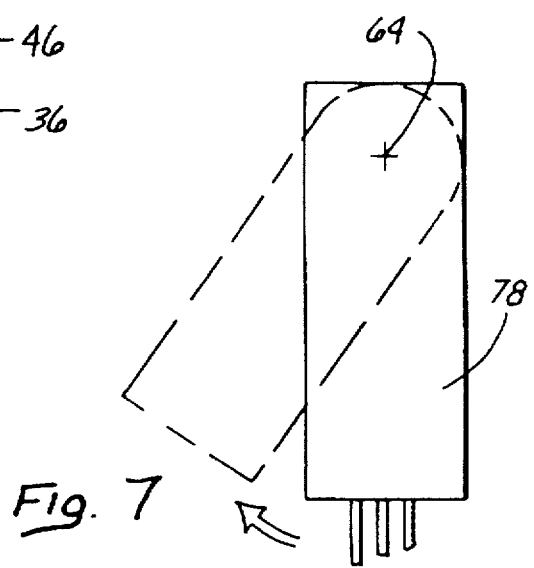
FIG. 7 is a schematic side view of the unit illustrated in FIG. 6.

A complete fiber illumination unit 68 having a modular dual-port construction, is illustrated schematically in FIGS. 6 through 8. The center module 70 of the unit contains the light source 12 and its dual reflector 14, together with a power supply 72, cooling fan 74, and all other associated electrical wiring, etc. Two side modules 76 and 78 preferably contain the fold mirrors 24 and 24a, the light pipes 28 and 28a, and sector lenses 36 and 36a that feed into the fibers 40 and 40a. As discussed in connection with FIG. 1, although the two modules 76 and 78 are substantially identical, there is no requirement that they be so. Having different sector lenses on either side allows coupling to a different number of fibers on the two sides. The side modules 76 and 78 can be detached easily from the central source module 70, using ordinary mechanical fasteners. The side modules can be rotated about the mechanical axis 64, as discussed in FIG. 1 and shown in FIG. 7, in order to allow convenient placement of the fiber output ports. This feature permits great flexibility for lighting installations with tight space restraints, in building utility closets and the like.

Although an exemplary embodiment of the invention has been shown and described, many other changes, modifications and substitutions, in addition to those set forth in the above paragraphs, may be made by one having ordinary skill in the art without necessarily departing from the spirit and scope of this invention.

We claim:

1. An optical fiber illumination system comprising a fiber illumination unit have a center module and at least one side module, wherein the center module contains a light source and a dual reflector and the at least one side module containing a light pipe, a multi-sectored lens, and at least one output fiber, the multi-sectored lens being adapted for receiving light directly from the light pipe.

2. The optical fiber illumination system as recited in claim 1, the multi-sectored lens focussing the light received from the light pipe into the at least one output fiber.

3. The optical fiber illumination system as recited in claim 1, the side module being rotatable with respect to the center module.

4. The optical fiber illumination system as recited in claim 1, wherein there are two side modules containing substantially identical optical system components.

5. The optical fiber illumination system as recited in claim 1, wherein there are two side modules containing substantially different optical system components.

6. The optical fiber illumination system as recited in claim 1, wherein said dual reflector generates a light beam having a ring-shaped cross section, the ring-shaped cross section persisting as the light beam traverses each optical component in the system.

7. An optical fiber illumination system, comprising:
   a light source for emitting light;
   a light pipe;
   a dual reflector disposed in proximity to the light source, the dual reflector being adapted for reflecting the emitted light from the light source into the light pipe;
   a multi-sectored lens; and
   at least one output fiber, the multi-sectored lens being adapted for receiving the reflected light from the light pipe and for focussing the light into the at least one output fiber.

8. The optical fiber illumination system as recited in claim 7, the dual reflector comprising two curved surfaces which are disposed in a back-to-back fashion.

9. The optical fiber illumination system as recited in claim 8, each of the two curved surfaces comprising an aperture disposed at a center of the curved surface.

10. The optical fiber illumination system as recited in claim 9, the light source being disposed at the centers of the two curved surfaces.

11. The optical fiber illumination system as recited in claim 7, the light source being placed at a focus of the dual reflector.

12. The optical fiber illumination system as recited in claim 11, further comprising a color wheel disposed between the light pipe and the multi-sectored lens.

13. The optical fiber illumination system as recited in claim 11, light source comprising an arc lamp.

14. The optical fiber illumination system as recited in claim 7, the dual reflector comprising at least one curved surface.

15. An optical fiber illumination system, comprising:
   a light source adapted for emitting light;
   a light pipe;
   a dual reflector disposed in proximity to the light source, the dual reflector being adapted for reflecting the emitted light from the light source into the light pipe; and
   a multi-sectored lens, the multi-sectored lens being adapted for receiving the reflected light from the light pipe and for focussing the light into a plurality of output fibers.

16. The optical fiber illumination system as recited in claim 15, each of the two curved surfaces comprising an aperture disposed at a center of the curved surface.

17. The optical fiber illumination system as recited in claim 16, the light source being disposed at the centers of the two curved surfaces.

18. The optical fiber illumination system as recited in claim 15, the light source comprising an arc lamp.

19. The optical fiber illumination system as recited in claim 15, the dual reflector comprising two curved surfaces which are disposed in a back-to-back fashion.

20. The optical fiber illumination system as recited in claim 15, the light source being placed at a focus of the dual reflector.

* * * * *